US012634654B2

(12) United States Patent
Bleckmann

(10) Patent No.: US 12,634,654 B2
(45) Date of Patent: May 19, 2026

(54) METHODS FOR IDENTIFYING ITEMS IN CLOSE PROXIMITY TO A MOBILE DEVICE OR WITHIN A DIGITAL IMAGE

(71) Applicant: Avery Dennison Retail Information Services LLC, Mentor, OH (US)

(72) Inventor: Frederick Bleckmann, Barrington, NH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 515 days.

(21) Appl. No.: 17/999,219

(22) PCT Filed: May 18, 2021

(86) PCT No.: PCT/US2021/032975
§ 371 (c)(1),
(2) Date: Nov. 18, 2022

(87) PCT Pub. No.: WO2021/236649
PCT Pub. Date: Nov. 25, 2021

(65) Prior Publication Data
US 2023/0224672 A1     Jul. 13, 2023

Related U.S. Application Data

(60) Provisional application No. 63/026,392, filed on May 18, 2020.

(51) Int. Cl.
H04W 4/02          (2018.01)
G06K 7/10          (2006.01)
(Continued)

(52) U.S. Cl.
CPC ........ H04W 4/023 (2013.01); G06K 7/10306 (2013.01); H04W 4/029 (2018.02); G06K 7/1417 (2013.01)

(58) Field of Classification Search
CPC ... H04W 4/023; H04W 4/029; G06K 7/10306
See application file for complete search history.

(56) References Cited

U.S. PATENT DOCUMENTS 6,937,998 B1     8/2005  Swartz et al.
8,694,366 B2     4/2014  Barnes, Jr.
(Continued)

FOREIGN PATENT DOCUMENTS

JP     2002-251571     9/2002
JP     2008-033571     2/2008
(Continued)

OTHER PUBLICATIONS

Invitation to Pay Additional Fees dated Sep. 9, 2021 issued in corresponding IA No. PCT/US2021/032975 filed May 18, 2021.
(Continued)

*Primary Examiner* — Erika A Washington

(57) ABSTRACT

Methods for identifying one or more items in close proximity to a mobile device and/or are within a digital image. The location of the mobile device can be determined using outdoor positioning systems ("OPS"), indoor positioning systems ("IPS"), or combinations thereof. The identity of the item or items can be determine using planograms; visual inventory; RFID handheld inventory; RFID overhead inventory; vision system inventory; UR; barcode; NEC; or combinations thereof. In some embodiments, the methods described herein include or involve identifying one or more items within a digital image, such as a photograph or video. The image has an identification (ID)/time stamp that is used to associate the items in the image that have been read in the same area as the image so that the items can be actively searched as a digital image to highlight or list items that are in the image.

20 Claims, 4 Drawing Sheets

(51) Int. Cl.
   _H04W 4/029_     (2018.01)
   _G06K 7/14_       (2006.01)

(56)           References Cited

U.S. PATENT DOCUMENTS

| | | | |
|---|---|---|---|
| 9,386,401 B2 | 7/2016 | Gold | |
| 9,503,854 B1 | 11/2016 | Kulfan et al. | |
| 9,799,065 B1 | 10/2017 | Dorner | |
| 9,824,387 B2 | 11/2017 | Haver et al. | |
| 10,430,798 B2 | 10/2019 | Volpi et al. | |
| 10,713,923 B1* | 7/2020 | Sacks | H04M 1/72403 |
| 2004/0153371 A1 | 8/2004 | Razumov | |
| 2004/0208362 A1 | 10/2004 | Suzuki | |
| 2010/0070365 A1 | 3/2010 | Siotia et al. | |
| 2012/0208592 A1 | 8/2012 | Davis et al. | |
| 2013/0290106 A1 | 10/2013 | Bradley et al. | |
| 2014/0214519 A1* | 7/2014 | Ekster | G06Q 30/0234 |
| | | | 705/14.34 |
| 2016/0163164 A1* | 6/2016 | Nair | H04M 1/72412 |
| | | | 455/557 |
| 2018/0247259 A1 | 8/2018 | Borders et al. | |
| 2019/0172088 A1* | 6/2019 | Mohiuddin | G06Q 30/0233 |
| 2019/0244436 A1* | 8/2019 | Stansell | G06Q 30/0643 |

FOREIGN PATENT DOCUMENTS

| | | |
|---|---|---|
| JP | 2010-026184 | 2/2010 |
| JP | 2010-262380 | 11/2010 |
| JP | 2014-056416 | 3/2014 |

OTHER PUBLICATIONS

International Search Report and Written Opinion dated Nov. 2, 2021 issued in corresponding IA No. PCT/US2021/032975 filed May 18, 2021.

International Preliminary Report on Patentability dated Nov. 17, 2022 issued in corresponding IA No. PCT/US2021/032975 filed May 18, 2021.

\* cited by examiner

METHODS FOR IDENTIFYING ITEMS IN CLOSE PROXIMITY TO A MOBILE DEVICE OR WITHIN A DIGITAL IMAGE

CROSS-REFERENCE TO RELATED APPLICATION(S)

The present application is a 371 of International Application No. PCT/US2021/032975, which was published in English on Nov. 25, 2021, and claims the benefit of U.S. Provisional Patent Application No. 63/026,392 filed May 18, 2020, both of which are incorporated herein by reference in their entireties.

FIELD

This invention is in the field of methods for identifying items in close proximity to a mobile device or within a digital image without having to manually scan each item individually.

BACKGROUND

Customers interested in searching for more information about a product using the product's digital identity (digital ID) are required to scan the items individually, for example, as a QR scan, a short range high frequency (HF) scan, or a Bluetooth Low Energy (BLE) beacon. This can be time consuming particularly in view of the fact that consumers have become accustomed to searching across multiple item classes during e-commerce searches. Moreover, if the customer is interested in complimentary items, the customer must find these items and scan them as well to obtain the necessary information.

Additionally, when consumers wish to scan the digital ID for an item in a retail location, the consumer typically has to handle the item in order to locate the tag and then handle and manipulate the orientation of the tag in order to scan the tag to obtain information about the product. Physical items, such as clothing, footwear, and tags can support germs, such as viruses, which can lead to infection of consumers who handle the items. For example, the coronavirus outbreak in 2020 involved the Covid-19 virus which was shown to survive on surface for three days or longer. Consumers are looking for a way to obtain information about products of interest to them without having to handle the item. Consumers are also looking for a way to obtain information about products quickly and accurately.

There exists a need for a method for providing product information to customers without the need for the customer to scan each item individually. There also exists a need for a method of providing product information as described above, wherein the user/customer can implement filters to only see the items of interest. There further exists a need for a method of providing product information as described herein, wherein brands can provide or suggest promotional advertising, availability, complementary products, and other information. There further exists a need for a method of providing product information as described herein, wherein brands can provide or suggest promotional advertising, availability, complementary products, and other information quickly and accurately to a mobile device.

Therefore, it is an object of the disclosure to provide the methods described above.

SUMMARY

Methods for identifying one or more items in close proximity to a mobile device and/or are within a digital image are described herein. In some embodiments, the mobile device includes, but is not limited to, smart phones, smart watches, tablets, fitness trackers, and cameras.

In some embodiments, the location of the mobile device is determined using one or more methods or techniques known in the art. Suitable methods and techniques include, but are not limited to, outdoor positioning systems ("OPS") and indoor positioning systems ("IPS"). Exemplary OPS include, but are not limited to, the global positioning system ("GPS"). Exemplary IPS include, but are not limited to, non-radio technologies and wireless technologies. Examples of non-radio technologies include, but are not limited to, magnetic positioning, inertial measurements, positioning based on visual markers, and location based on known visual features. Examples of wireless technologies include, but are not limited to, ultra wide band (UWB), WiFi positioning system (WiPS or WFPS), Bluetooth, Bluetooth 5.1, Bluetooth low energy (BLE), choke point concepts, grid concepts, long range sense concepts, angle of arrival, time of arrival, received signal strength indication, and combinations thereof.

In some embodiments, the method or techniques used to determine the location of the mobile device is accurate within 5 meters, 4 meters, 3 meters, 2 meters, 1 meter, 0.9 meters, 0.8 meters, 0.7 meters, 0.6 meters, 0.5 meters, 0.4 meters, 0.3 meters, 0.2 meters, 0.1 meters, or less.

In some embodiments, the location of the mobile device is determined using one or more techniques described herein and the one or more items in close proximity to the mobile device are identified. In some embodiments, the term "close proximity" means within about 10 meters, 9 meters, 8 meters, 7 meters, 6 meters, 5 meters, 4 meters, 3 meters, 2 meters, 1 meter, 0.9 meters, 0.8 meters, 0.7 meters, 0.6 meters, 0.5 meters, 0.4 meters, 0.3 meters, 0.2 meters, 0.1 meter, or less. However, the item or items may be further away.

In some embodiments, the identity of the item or items can be determined using one or more techniques known in the art. Exemplary techniques include, but are not limited to, planograms; visual inventory; RFID handheld inventory; RFID overhead inventory; vision system inventory; QR; barcode; NEC; or other methods known in the art.

In some embodiments, one or more items at the location of the mobile device have attached thereto one or more sensors or devices which can be detected by localized scanners. Such are items are said to be digitally identified. The sensors or devices can be incorporated into a label, such as a pressure adhesive label or other type of label, a printed fabric label (PFL), or a tag, such as a hanging tag or hang tag. In some embodiments, the hang tag contains a tag having printed thereon product information and an RFID inlay incorporated therein, such as incorporated into an adhesive label which is applied to the hang tag.

The sensor or device can be any sensor or device known in the art that is suitable for the methods and applications described herein. In some embodiments, the sensor or device is, for example, a radio frequency identification (RFID, such as UHF or HF) sensor, a near field communication (NFC) sensor, a quick response (QR) code, machine readable code, vision system, Bluetooth Low Energy (BLE) beacons, or other digital identification (ID) systems. In some embodiments, the location of the mobile device is determined by one or more of the techniques described above and the items in proximity to the mobile device are identified using UHF RFID. In some embodiments, the digital ID system is UHF Gent RFID or similar standard.

In some embodiments, the methods described herein include or involve identifying one or more items within a digital image, such as a photograph or video. The photograph or video can be taken using a mobile device including, but not limited to, a smart phone, tablet, smartwatch, digital camera, etc. In some embodiments, the one or more items within the photograph or video have a digital ID recorded by a reader in the device itself, a smart shelf, a scheduled inventory run, or other digital ID reader, or combinations thereof. In some embodiments, the image has an identification (ID)/time stamp that is used to associate the items in the image that have been read in the same area as the image so that the items can be actively searched as a digital image to highlight or list items that are in the image. In some embodiments, the identification (ID) stamp that indicates the location of the device used to take the photograph or video can be determined or generated using one or more of the techniques described above.

In some embodiments, the location of the device and the item or items in proximity and/or located within a photograph or video are stored in a digital repository. In some embodiments, the location of the device and the item or items are stored in the same digital repository or different digital repositories. The digital repository can be a cloud based application, locally hosted (e.g., on the device itself or a device on the premises, such as a lap top, tablet, mobile device, PC, desk top computer, work station, or server), or combinations thereof.

In some embodiments, the location of the device and the identity of the item or items are stored in a digital repository as described above and the location of the device and the identity of the item or items are associated with each other such that the items and information thereon are provided to a user, e.g., a customer. The user can manually search/navigate all identified items. Alternatively, the user can search manually in combination with one or more filters to limit or reduce the number of items presented to the user. For example, the user may wish to look only at a certain type of garment or clothing, such as shirts, pants, sweaters, jackets, etc.; footwear, accessories, such as jewelry, etc. In other embodiments, the filter(s) may limit the items presented to the user by garment type as well as brand; color and/or size; availability; etc. When the user sees one or more items of interest, they can select the items to see additional information. The methods described herein can also include a search feature to control the viewability, experience, and/or order in which items are displayed. For example, the user can slide content away or slide content to save. In alternative embodiments, the user could check a box or indicate interest using other known methods.

Examples of the type of the information provided to the user include, but are not limited to, location, brand, price, size, availability, coupons or discounts, related or complementary information about the item, such as sustainable materials and manufacturing, interactive consumer experiences, and combinations thereof.

The methods described herein can be used in relation to a variety of types of consumer good including, but not limited to, clothing, footwear, and accessories; wine and spirits; consumer electronics; vehicles (cars, trucks, personal watercraft, boats, planes, etc.); sporting goods; personal care products; etc.

DETAILED DESCRIPTION

Figure 1:
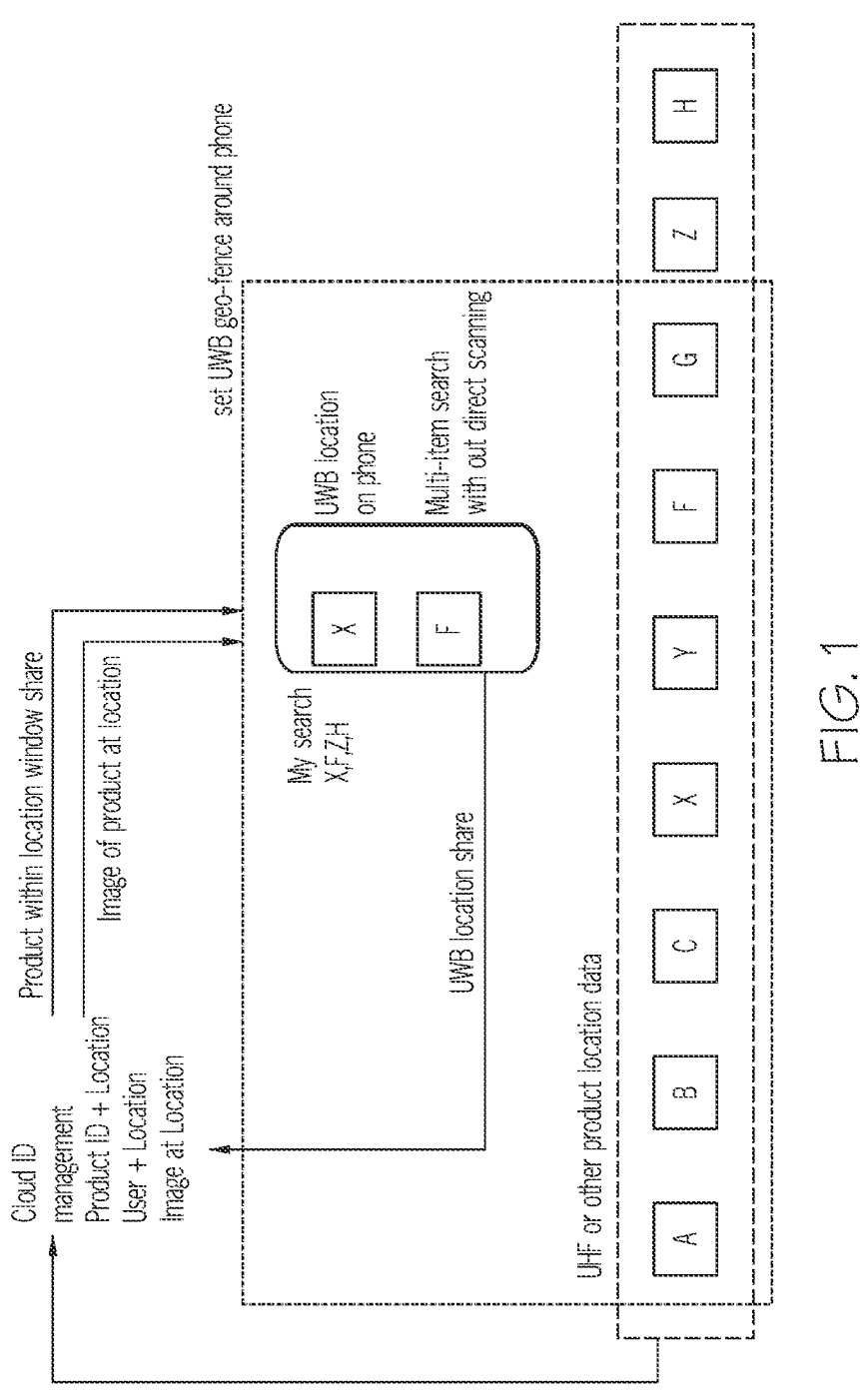
FIG. 1 is a schematic of performing a mobile search for a digitally identified product.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner. Moreover, any one of the elements or steps described herein can be, or are, combined with any and all other elements or steps, regardless of whether the combination is explicitly described. For example, any of the types of mobile devices can be combined with one or more the techniques described herein to identify location and one or more techniques described herein to identify an object having one or more of the sensors described herein and the information can be provided to a mobile device, a device on the premises, or combinations thereof, and can be hosted locally or in the cloud.

I. Methods for Identifying Items

A. In Close Proximity to a Mobile Device

The method described herein can allow a user to be presented with (filtered) choices of items or products that are within particular search criteria. The items or products are digitally identified and scanned by a local RFID reader with their presence at a certain location published to a digital repository, such as a cloud-based application or locally hosted repository. The repository stores the product information by geo location, defined area of a store, or other known coordinate systems. The customer/user enters the coordinate area with their mobile device and the coordinates are delivered by one or more locationing systems known in the art. The user coordinates are communicated to the cloud (or locally hosted repository) or preferred data referencing destination. The results can be matched by filter choices and user location and delivered to the user for review. The user can select the choices that are most significant to them to save, view more product information, place on hold, or explore complimenting or alternative looks.

1. Determining Location of the Mobile Device

In some embodiments, the method includes identifying one or more items in close proximity to a mobile device, such as a mobile phone or tablet. In some embodiments, the method includes determining the location of the mobile device and associating the location of the mobile device with one or more digitally identified items at the location of the mobile device.

A variety of systems, applications, or techniques known in the art can be used to determine the location of the mobile device. In some embodiments, the system or application is within or on the mobile device. In some embodiments, the system or application within or on the device works in conjunction with one or more external nodes to determine the location of the mobile device. Exemplary systems or applications include indoor positioning systems (IPS) and outdoor positioning systems (OPS). Outdoor positioning systems include, but are not limited to, the global positioning system (GPS). The Global Positioning System (GPS) is a U.S-owned utility that provides users with positioning, navigation, and timing (PNT). The system contains three segments: space segment (i.e., 24 operating satellites), control segment (i.e., monitoring and control of satellites), and user segment (i.e., GPS receiver equipment which receives signals from the operating satellites and uses the signals to calculate the user's three dimensional position and timing).

An indoor positioning system is a network of devices (and/or nodes) used to locate people or objects where GPS and other satellite-based technologies lack precision or fail entirely, such as inside multistory buildings (e.g., malls and department stores), airports, alleys, parking garages, and underground locations. Reconfigured mobile devices, such as smartphones, smart watches, fitness trackers, and digital cameras can be used to provide indoor positioning. The systems or applications used for indoor positioning can rely on different types of electromagnetic radiation, such as light (visible, UV, infrared), radio waves, and magnetic fields as well as acoustic signals and behavioral analytics. IPS can typically achieve position accuracy of 2 cm. In some embodiments, the IPS involves distance measurements to nearby anchor nodes (nodes with known fixed position, e.g., WiFi/LiFi access points, Bluetooth beacons, and Ultra-Wideband beacons), magnetic positioning, and dead reckoning. Detecting the device's orientation (often referred to as the compass direction in order to disambiguate it from smartphone vertical orientation) can be achieved either by detecting landmarks inside images taken in real time, or by using trilateration with beacons. There also exist technologies for detecting magnetometric information inside buildings or locations with steel structures.

Examples of IPS include, but are not limited to, non-radio technologies and wireless technologies. Examples of non-radio technologies include, but are not limited to, magnetic positioning, inertial measurements, positioning based on visual markers, and location based on known visual features. Examples of wireless technologies include, but are not limited to, ultra wide band (UWB), WiFi positioning system (WiPS or WFPS), Bluetooth, Bluetooth 5.1, Bluetooth low energy (BLE), choke point concepts, grid concepts, long range sense concepts, angle of arrival, time of arrival, received signal strength indication, and combinations thereof.

Magnetic positioning can offer smartphones an indoor accuracy of 1-2 meters with 90% confidence level, without using the additional wireless infrastructure for positioning. Magnetic positioning is based on the iron inside buildings that create local variations in the Earth's magnetic field. Non-optimized compass chips inside smartphones can sense and record these magnetic variations to map indoor locations.

Pedestrian dead reckoning and other approaches for positioning of pedestrians propose an inertial measurement unit carried by the pedestrian either by measuring steps indirectly (step counting) or in a foot mounted approach, sometimes referring to maps or other additional sensors to constrain the inherent sensor drift encountered with inertial navigation. The MEMS inertial sensors can suffer from internal noises which result in cubically growing position error with time. To reduce the error growth in such devices a Kalman Filtering based approach is often used. However, in order to make it capable to build the map itself, the SLAM algorithm framework can be used.

Inertial measures generally cover the differentials of motion. The location is determined with integrating and thus requires integration constants to provide results. The actual position estimation can be found as the maximum of a 2-d probability distribution which is recomputed at each step taking into account the noise model of all the sensors involved and the constraints posed by walls and furniture. Based on the motions and users' walking behaviors, IPS is able to estimate users' locations by machine learning algorithms.

A visual positioning system can determine the location of a camera-enabled mobile device by decoding location coordinates from visual markers. In such a system, markers are placed at specific locations throughout a venue, each marker encoding that location's coordinates: latitude, longitude and height off the floor. Measuring the visual angle from the device to the marker enables the device to estimate its own location coordinates in reference to the marker. Coordinates include latitude, longitude, level and altitude off the floor.

A collection of successive snapshots from a mobile device's camera can build a database of images that is suitable for estimating location in a venue. Once the database is built, a mobile device moving through the venue can take snapshots that can be interpolated into the venue's database, yielding location coordinates. These coordinates can be used in conjunction with other location techniques for higher accuracy. Note that this can be a special case of sensor fusion where a camera plays the role of yet another sensor.

Ultra wide band (UWB) is a technology for the transmission of data using techniques which cause a spreading of the radio energy over a very wide frequency band, with a very low power spectral density. The low power spectral density limits the interference potential with conventional radio systems, and the high bandwidth can allow very high data throughput for communications devices, or high precision for location and imaging devices. UWB has an accuracy of 5-10 cm.

Wi-Fi positioning system, also referred to as WiPS or WFPS, is based on measuring the intensity of the received signal (received signal strength in English RSS) and the method of "fingerprinting". Typical parameters useful to geolocate the Wi-Fi hotspot or wireless access point include the SSID and the MAC address of the access point. The accuracy depends on the number of positions that have been entered into the database. The possible signal fluctuations that may occur can increase errors and inaccuracies in the path of the user. Anyplace is a free and open-source Wi-Fi positioning system that allows anybody to rapidly map indoor spaces.

Bluetooth is best suited to determine proximity not exact location. Bluetooth was not intended to offer a pinned location like GPS; rather it is known as a geo-fence or micro-fence solution which makes it an indoor proximity solution. Micromapping and indoor mapping has been linked to Bluetooth and to the Bluetooth Low Energy (LE) based iBeacon promoted by Apple Inc. Large-scale indoor positioning system based on iBeacons has been implemented and applied in practice. Bluetooth 5.1 is an improvement over Bluetooth since angle to the antenna can be measured. This angle can be used to determine inside position accurate to centimeter level.

Choke point is a simple concept of location indexing and presence reporting for tagged objects, uses known sensor identification only. This is usually the case with passive radio-frequency identification (RFID)/NFC systems, which do not report the signal strengths and various distances of single tags or of a bulk of tags and do not renew any before known location coordinates of the sensor or current location of any tags. Operability of such approaches typically requires some narrow passage to prevent from passing by out of range. An example of a choke point scheme is "check-in", which is a feature of several social media platforms. In some embodiments, "check-in" involves the consumer scans a QR or taps an NFC sensor that locates the device via the QR or NFC sensor being at a known location.

Grid concepts involve a dense network of low-range receivers arranged, e.g. in a grid pattern for economy, throughout the space being observed. Due to the low range, a tagged entity will be identified by only a few close, networked receivers. An identified tag must be within range of the identifying reader, allowing a rough approximation of the tag location. Advanced systems combine visual coverage with a camera grid with the wireless coverage for the rough location. Long range sensor concepts use a continuous physical measurement (such as angle and distance or distance only) along with the identification data in one combined signal. Reach by these sensors mostly covers an entire floor, or an aisle or just a single room. Short reach solutions are applied with multiple sensors and overlapping reach.

Angle of arrival (AoA) is the angle from which a signal arrives at a receiver. AoA is usually determined by measuring the time difference of arrival (TDOA) between multiple antennas in a sensor array. In other receivers, it is determined by an array of highly directional sensors—the angle can be determined by which sensor received the signal. AoA is usually used with triangulation and a known base line to find the location relative to two anchor transmitters.

Time of arrival (ToA, also known as time of flight) is the amount of time a signal takes to propagate from transmitter to receiver. Because the signal propagation rate is constant and known (ignoring differences in mediums) the travel time of a signal can be used to directly calculate distance. Multiple measurements can be combined with trilateration and multilateration to find a location. This is the technique used by GPS. Systems which use ToA, generally require a complicated synchronization mechanism to maintain a reliable source of time for sensors (though this can be avoided in carefully designed systems by using repeaters to establish coupling). The accuracy of the TOA based methods can suffer from massive multipath conditions in indoor localization, which is caused by the reflection and diffraction of the RF signal from objects (e.g., interior wall, doors or furniture) in the environment. However, it is possible to reduce the effect of multipath by applying temporal or spatial sparsity based techniques.

Received signal strength indication (RSSI) is a measurement of the power level received by sensor. Because radio waves propagate according to the inverse-square law, distance can be approximated (typically to within 1.5 meters in ideal conditions and 2 to 4 meters in standard conditions) based on the relationship between transmitted and received signal strength (the transmission strength is a constant based on the equipment being used), as long as no other errors contribute to faulty results.

Once the location of the mobile device has been determined, the location can be stored. In some embodiments, the location is sent to, or stored in, a digital identity repository. In some embodiments, the repository is on or within the mobile device itself. In other embodiments, the repository is in the cloud or is a cloud-based application. In still other embodiments, the repository is, or is in, a distributed ledger, such as a block chain. In still other embodiments, the repository is in or on a device on the premises at the location, such as desk top computer, a lap top computer, a smart pad, and/or a hand held device. In still other embodiments, the repository is a combination of the repositories above.

2. Determining the Identification of an Item or a Plurality of Items in Close Proximity to the Mobile Device The methods described therein include identifying items in close proximity to a mobile device. Methods for determining the location of the mobile device are described in detail above. The methods described above can be used in conjunction with or more methods or techniques for identifying an item or plurality of items in proximity to the mobile device. In some embodiments, the method for identifying the items involves or includes a planogram, which is a visual representation of a store's products or services on display. They are considered a tool for visual merchandising; visual inventory; RFID handheld inventory; RFID overhead inventory; vision system inventory; QR; barcode; NEC; or other methods known in the art.

In some embodiments, one or more items at the location of the mobile device have attached thereto one or more sensors which can be detected by localized scanners. Such are items are said to be digitally identified. The sensors can be incorporated into a label, such as a pressure adhesive label or other type of label, or a tag, such as a hanging tag. The sensor can be any sensor known in the art that is suitable for the methods and applications described herein. In some embodiments, the sensor is, for example, a radio frequency identification (RFID, such as UHF or HF) sensor, a near field communication (NFC) sensor, a quick response (QR) code, machine readable code, vision system, Bluetooth Low Energy (BLE) beacons, or other digital identification (ID) systems. In some embodiments, the location of the mobile device is determined by one or more of the techniques described above and the items in proximity to the mobile device are identified using UHF RFID. In some embodiments, the digital ID system is UHF Gent RFID or similar standard.

A typical RFID device generally includes an antenna for wirelessly transmitting and/or receiving RF signals and analog and/or digital electronics operatively connected thereto. So called active or semi-passive RFID devices may also include a battery or other suitable power source. Commonly, the electronics are implemented via an integrated circuit (IC) or microchip or other suitable electronic circuit and may include, e.g., communications electronics, data memory, control logic, etc. In operation, the IC or microchip functions to store and/or process information, modulate and/or demodulate RF signals, as well as optionally performing other specialized functions. In general, RFID devices can typical retain and communicate enough information to uniquely identify individuals, packages, inventory and/or other like objects, e.g., to which the RFID device is affixed.

Commonly, an RFID reader or base station is used to wirelessly obtain data or information (e.g., such as an identification code) communicated from an RFID device. Typically, an RFID device is configured to store, emit, or otherwise exhibit an identification code or other identifier(s). The manner in which the RFID reader interacts and/or communicates with the RFID device generally depends on the type of RFID device. A given RFID device is typically categorized as a passive device, an active device, a semi-passive device (also known as a battery-assisted or semi-active device) or a beacon type RFID device (which is generally considered as a sub-category of active devices). Passive RFID devices generally use no internal power source, and as such, they are passive devices which are only active when an RFID reader is nearby to power the RFID device, e.g., via wireless illumination of the RFID device with an RF signal and/or electromagnetic energy from the RFID reader. Conversely, semi-passive and active RFID devices are provided with their own power source (e.g., such as a small battery). To communicate, conventional RFID devices (other than so called beacon types) respond to queries or interrogations received from RFID readers. The response is typically achieved by backscattering, load modulation and/or other like techniques that are used to manipulate the RFID reader's field. Commonly, backscatter is used in far-field applications (i.e., where the distance between the RFID device and reader is greater than approximately a few wavelengths), and alternately, load modulation is used in near-field applications (i.e., where the distance between the RFID device and reader is within approximately a few wavelengths).

Passive RFID devices typically signal or communicate their respective data or information by backscattering a carrier wave from an RFID reader. That is, in the case of conventional passive RFID devices, in order to retrieve information therefrom, the RFID reader typically sends an excitation signal to the RFID device. The excitation signal energizes the RFID device which transmits the information stored therein back to the RFID reader. In turn, the RFID reader receives and decodes the information from the RFID device. As previously noted, passive RFID devices commonly have no internal power supply. Rather, power for operation of a passive RFID device is provided by the energy in the incoming RF signal received by the RFID device from the RFID reader. Generally, a small electrical current induced in the antenna of the RFID device by the incoming RF signal provides sufficient power for the IC or microchip in the RFID device to power up and transmit a response. This means that the antenna generally has to be designed both to collect power from the incoming signal and also to transmit the outbound backscatter signal. Passive RFID devices have the advantage of simplicity and long life (e.g., having no battery to go dead). Nevertheless, their performance may be limited. For example, passive RFID devices generally have a more limited range as compared to active RFID devices.

Active RFID devices, as opposed to passive ones, are generally provisioned with their own transmitter and a power source (e.g., a battery, photovoltaic cell, etc.). In essence, an active RFID device employs the self-powered transmitter to broadcast a signal which communicates the information stored on the IC or microchip in the RFID device. Commonly, an active RFID device will also use the power source to power the IC or microchip employed therein.

Generally, there are two kinds of active RFID devices-one can be considered as a transponder type of active RFID device and the other as a beacon type of active RFID device. A significant difference is that active transponder type RFID devices are only woken up when they receive a signal from an RFID reader. The transponder type RFID device, in response to the inquiry signal from the RFID reader, then broadcasts its information to the reader. As can be appreciated, this type of active RFID device conserves battery life by having the device broadcast its signal only when it is within range of a reader. Conversely, beacon type RFID devices transmit their identification code and/or other data or information autonomously (e.g., at defined intervals or periodically or otherwise) and do not respond to a specific interrogation from a reader.

Generally, active RFID devices, due to their on-board power supply, may transmit at higher power levels (e.g., as compared to passive devices), allowing them to be more robust in various operating environments. However, the battery or other on-board power supply can tend to cause active RFID devices to be relatively larger and/or more expensive to manufacture (e.g., as compared to passive devices). Additionally, as compared to passive RFID devices, active RFID devices have a potentially more limited shelf life—i.e., due to the limited lifespan of the battery. Nevertheless, the self-supported power supply commonly permits active RFID devices to include generally larger memories as compared to passive devices, and in some instances the on-board power source also allows the active device to include additional functionality, e.g., such as obtaining and/or storing environmental data from a suitable sensor.

Semi-passive RFID devices are similar to active devices in that they are typically provisioned with their own power source, but the battery commonly only powers the IC or microchip and does not provide power for signal broadcasting. Rather, like passive RFID devices, the response from the semi-passive RFID device is usually powered by means of backscattering the RF energy received from the RFID reader, i.e., the energy is reflected back to the reader as with passive devices. In a semi-passive RFID device, the battery also commonly serves as a power source for data storage.

A conventional RFID device will often operate in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device (i.e., active, passive, etc.). In some embodiments, passive LF RFID devices (also referred to as LFID or LowFID devices) can usually be read from within approximately 12 inches (0.33 meters); passive HF RFID devices (also referred to as HFID or HighFID devices) can usually be read from up to approximately 3 feet (1 meter); and passive UHF RFID devices (also referred to as UHFID devices) can be typically read from approximately 10 feet (3.05 meters) or more. However, the distances above are exemplary and the distances may vary (e.g., longer or shorter) depending on the characteristics listed above. One important factor influencing the read range for passive RFID devices is the method used to transmit data from the device to the reader, i.e., the coupling mode between the device and the reader-which can typically be either inductive coupling or radiative/propagation coupling. Passive LFID devices and passive HFID devices commonly use inductive coupling between the device and the reader, whereas passive UHFID devices commonly use radiative or propagation coupling between the device and the reader.

In inductive coupling applications (e.g., as are conventionally used by passive LFID and HFID devices), the device and reader are typically each provisioned with a coil antenna that together form an electromagnetic field there between. In inductive coupling applications, the device draws power from the field, uses the power to run the circuitry on the device's IC or microchip and then changes the electric load on the device antenna. Consequently, the reader antenna senses the change or changes in the electromagnetic field and converts these changes into data that is understood by the reader or adjunct computer. Because the coil in the device antenna and the coil in the reader antenna have to form an electromagnetic field there between in order to complete the inductive coupling between the device and the reader, the device often has to be fairly close to the reader antenna, which therefore tends to limit the read range of these systems.

Alternately, in radiative or propagation coupling applications (e.g., as are conventionally used by passive UHFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent back to the reader (i.e., amplitude shift keying), shift the reflected wave so it is out of phase received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RFID device is also commonly affected by numerous factor, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices are typically provisioned with a coil antenna having many turns in order to produce enough voltage to operate the device's IC or microchip. Comparatively, a conventional HFID passive device will often be provisioned with an antenna which is a planar spiral (e.g., with 5 to 7 turns over a credit-card-sized form factor), which can usually provide read ranges on the order of tens of centimeters. Commonly, HFID antenna coils can be less costly to produce (e.g., compared to LFID antenna coils), since they can be made using techniques relatively less expensive than wire winding, e.g., lithography or the like. UHFID passive devices are usually radiatively and/or propagationally coupled with the reader antenna and consequently can often employ conventional dipole-like antennas.

In some embodiments, the digital ID system is UHF Gent RFID or similar standard. Near field communication, abbreviated NFC, is a form of contactless communication between mobile devices, such as smartphones or tablets, that utilizes electromagnetic radio fields rather than radio transmissions (e.g., Bluetooth, WiFi). NFC is an offshoot of RFID design for use by device and objects that are in close proximity to each other. Three types of NFC technology are currently in use: Type A, Type B, and FeliCa. The technology behind NFC allows a device, known as a reader, interrogator, or active device, to create a radio frequency current that communicates with another NFC compatible device or a small NFC tag holding the information the reader wants. Passive devices, such as the NFC tags, store information and communicate with the reader but do not actively read other devices. Peer-to-peer communication through two active devices is also a possibility with NFC. This allows both devices to send and receive information.

Quick Response (QR) codes are a type of matrix barcode (2-D barcode) which is machine-readable. QR codes often contain data for a locator, identifier, or tracker that points to a website or application. A QR code uses four standardized encoding modes (numeric, alphanumeric, byte/binary, and kanji) to store data efficiently; extensions may also be used. A QR code is detected by a 2-dimensional digital image sensor and then digitally analyzed by a programmed processor. The processor locates the three distinctive squares at the corners of the QR code image, using a smaller square (or multiple squares) near the fourth corner to normalize the image for size, orientation, and angle of viewing. The small dots throughout the QR code are then converted to binary numbers and validated with an error-correcting algorithm.

The amount of data that can be stored in the QR code symbol depends on the datatype (mode, or input character set), version (1, . . . , 40, indicating the overall dimensions of the symbol, i.e. 4×version number+17 dots on each side), and error correction level. The maximum storage capacities occur for version 40 and error correction level L (low), denoted by 40-L.

Bluetooth beacons use Bluetooth low energy proximity sensing to transmit a universally unique identifier picked up by a compatible app or operating system. The identifier and several bytes sent with it can be used to determine the device's physical location, track customers, or trigger a location-based action on the device such as a check-in on social media or a push notification. Bluetooth beacons differ from some other location-based technologies as the broadcasting device (beacon) is only a 1-way transmitter to the receiving smartphone or receiving device, and necessitates a specific app installed on the device to interact with the beacons.

The scanner can be located at or inside the location, on or within the mobile device, or combinations thereof. The sensors can provide variable information about the item, such as location, prize, size, color, identity, etc., and combinations thereof. The variable information, such as location, can be sent to a digital repository. In some embodiments, the digital repository is the same digital repository wherein the location of the mobile device is stored. In other embodiments, the digital repository is a different digital repository from the one where the location of the mobile device is stored. The locations of the repository are as described above. The location of the mobile device and the item(s) are associated with each other and accessible by the mobile device in order to provide information about the items or products to the user.

The user can manually search/navigate all identified items. Alternatively, the user can search manually in combination with one or more filters to limit or reduce the number of items presented to the user. For example, the user may wish to look only at a certain type of garment or clothing, such as shirts, pants, sweaters, jackets, etc.; footwear, accessories, such as jewelry, etc. In other embodiments, the filter(s) may limit the items presented to the user by garment type as well as color and/or size; availability; etc. When the user sees one or more items of interest, they can select the items to see additional information. The methods described herein can also include a search feature to control the viewability, experience, and/or order in which items are displayed. For example, the user can slide content away or slide content to save. In alternative embodiments, the user could check a box or indicate interest using other known methods.

The sensors can provide information in addition to location. Examples include, but are not limited to, price, size, availability, coupons or discounts, related or complementary, information about the item, such as sustainable materials and manufacturing, interactive consumer experiences, and combinations thereof. While the examples discussed above involve clothing, footwear, and accessories, the methods described can be used for any items sold in commerce, such as wine and spirits, consumer electronics, vehicles (cars, trucks, personal watercraft); sporting goods, personal care products, etc.

In some embodiments, the method further includes leveraging online merchant systems, such as Google Merchant Center and the mobile search infrastructure therein, to help display content and product descriptions. RFID functionality can also enrich the search data to show product specific information like availability of particular sizes or availability of similar products. Brands use services such as Google Merchant Center and their own websites to display searchable content. This content can serve as the source for critical content pieces.

FIGS. 1 is a schematic of the mobile search of digitally identified products. FIG. 1 shows a mobile device and the process for identifying the location of the mobile device and storage of the location in a cloud-based application. Data for the digitally identified products are also stored in the cloud-based application. The cloud-based application sends information to the device regarding digitally identified products that are found within an image taken by the device or within the location area of the device.

Figure 2:
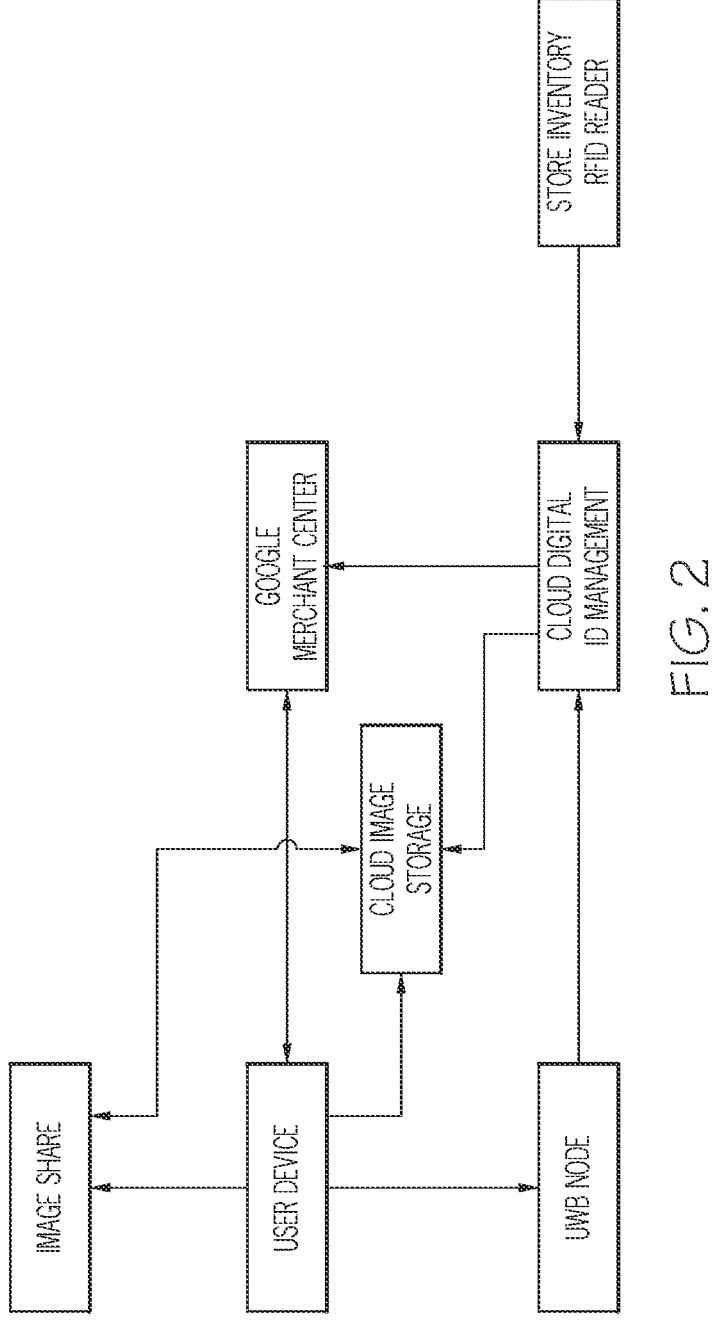
FIG. 2 is a flow diagram of performing a mobile search of a digitally identified product and associating the results of that search with an e-commerce site.

FIG. 2 is a flow diagram of the process shown in FIG. 1 and then locating the digitally identified products in an e-commerce site.

Figure 3:
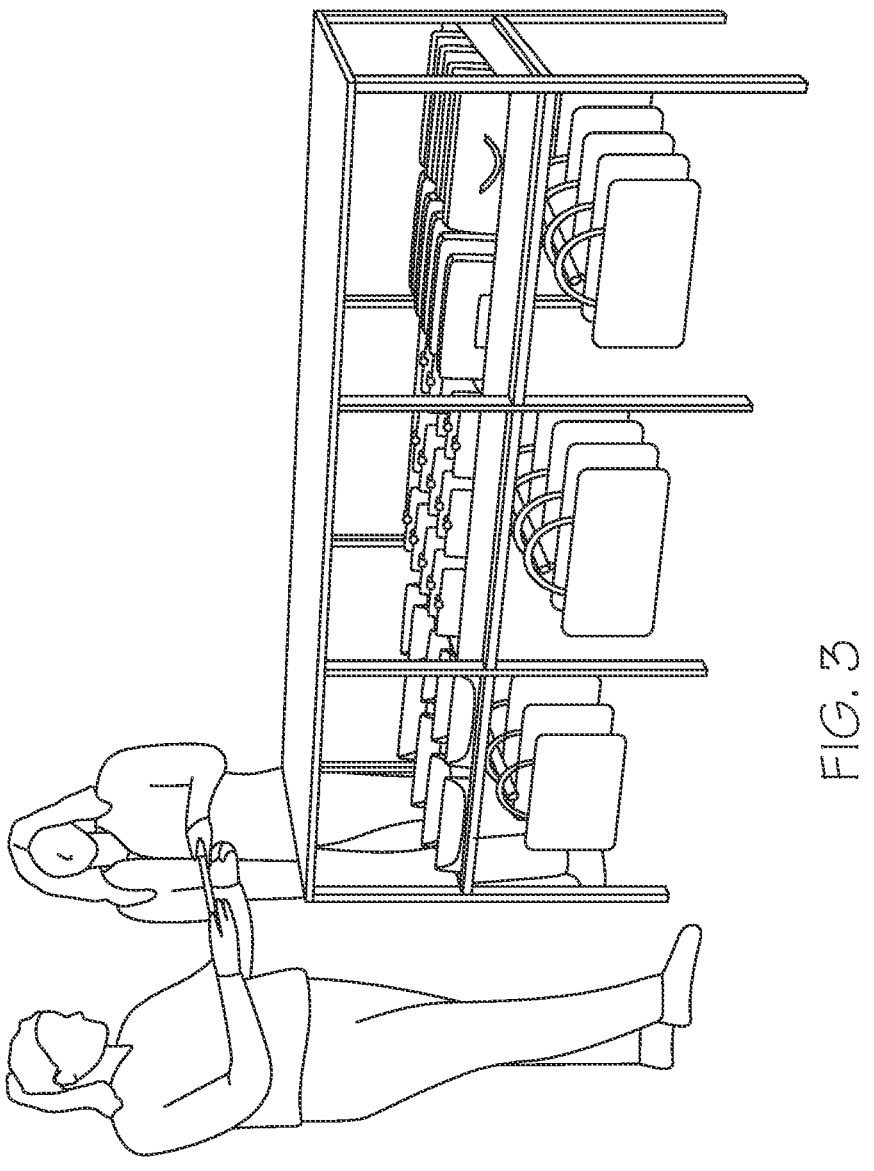
FIG. 3 is a pictorial representation of performing a mobile search for a digitally identified product.
Figure 3:
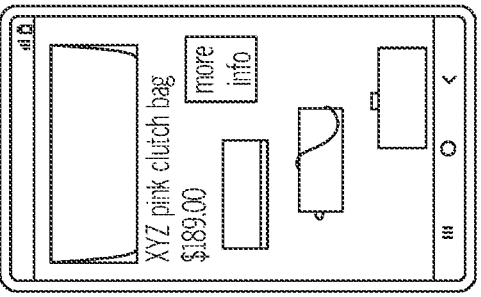

FIG. 3 is a pictorial representation of the schematic shown in FIG. 1, wherein digitally identified products found within the location of a mobile device are presented to the user.

B. Within a Digital Image

In some embodiments, the method involves a user (e.g., customer) taking a digital image, such as a photograph or video, with a mobile device, such as a mobile phone, tablet, digital camera, etc., wherein the image contains items that have a digital ID recorded by a reader in the device itself, a smart shelf, a scheduled inventory run, or other digital ID reader. The image has an identification (ID)/time stamp that is used to associate the items in the image that have been read in the same area as the image so that the items can be actively searched as a digital image to highlight or list items that are in the image, for example, for advertising or reordering processes. In some embodiments, the image can be stored along with the corresponding digital ID items in the photo and the combination can be shared on social media and/or between one user and another user to expand advertising opportunities.

As discussed above, when the user takes a digital image, the image has contained therein an identification (ID) and/or time stamp that allowed the location of the image to be determined. The location of the image can be determined using one or more of the techniques or applications discussed above with respect to determining the location of a mobile device. Likewise, the digitally identified products can contain a sensor that can be detected or read by a scanner. The sensor can be one or more of the sensor types described above with respect to locating digitally identified products within the location of a mobile device. The scanner used to detect the digitally identified products can be one or more of the scanner types discussed above with respect to locating digitally identified products within the location of a mobile device. The information about the digitally identified product and the location where the image was taken can be stored in the same or different digital repositories as described above.

Figure 4:
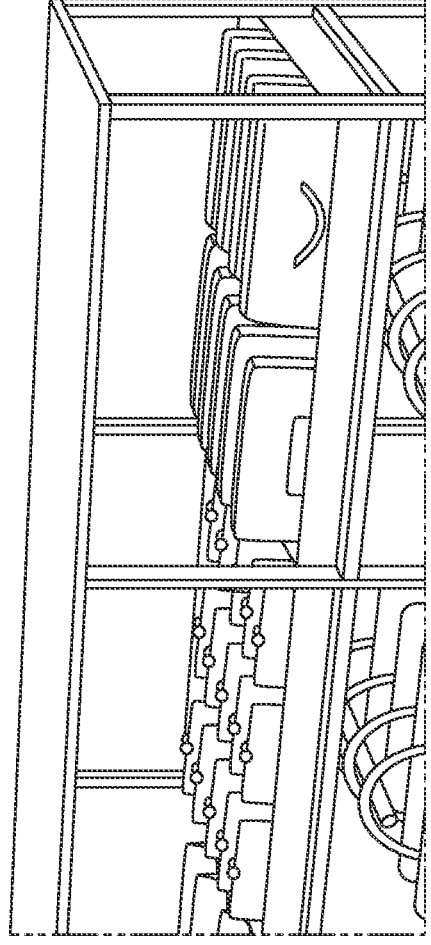
FIG. 4 is a pictorial representation of identifying one or more digitally identified items recorded in a digital image.
Figure 4:
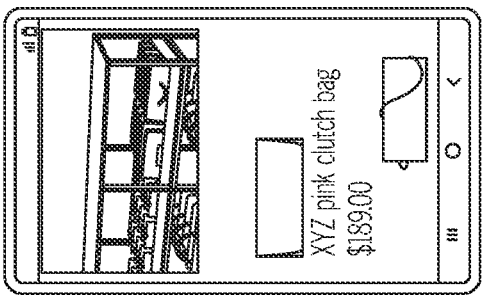

FIG. 4 is a pictorial representation of the schematic shown in FIG. 1, wherein digitally identified products found within a digital image taken by a mobile device are presented to the user.

What is claimed is:

1. A method for identifying one or more items in close proximity to a mobile device, the method comprising:

determining a location of the mobile device;

storing the location of the mobile device in a first digital identity repository;

scanning, by a localized scanner, for each of the one or more items, a sensor attached to the item of the one or more items, obtaining the location of each item of the one or more items from the scanning of the sensor attached to that item;

storing the location of each item of the one or more items in a second digital identity repository;

determining the one or more items to be in close proximity to the mobile device by comparing the location of the mobile device with the obtained location of each item of the one or more items based on the locations stored in the first and second digital identity repository; and associating the location of the mobile device with one or more items at the location of the mobile device.

2. The method of claim 1, wherein the location of the mobile device is determined by a location system or application within or on the mobile device.

3. The method of claim 2, wherein the system or application operates in conjunction with one or more nodes to determine the location of the mobile device.

4. The method of claim 2, wherein the system or application is selected from the group consisting of ultra wide band (UWB), global position system (GPS), vision systems, WiFi positioning system, (WiPS or WFPS), Bluetooth low energy (BLE), magnetic field detection, and combinations thereof.

5. The method of claim 1, wherein the location of the mobile device is stored on the mobile device.

6. The method of claim 1, wherein the location of the mobile device is stored in the cloud.

7. The method of claim 1, wherein the location of the mobile device is stored in a distributed ledger.

8. The method of claim 1, wherein the location of the mobile device is stored on a device on the premises at the location.

9. The method of claim 1, wherein the one or more sensors are selected from the group consisting of radio frequency identification (RFID), near field communication (NFC), quick response (QR) code, BLE, and combinations thereof.

10. The method of claim 9, wherein the localized scanners are located at or inside the location, on or in or part of the mobile device, and combinations thereof.

11. The method of claim 10, wherein the one or more sensors provide the location of the item.

12. The method of claim 11, wherein the first and second digital identity repository are a same digital identity repository, and wherein the digital identity repository stores product information by geo location and defined area coordinates to enable filtered searching of items within the location.

13. The method of claim 12, wherein the location of the item is stored on the mobile device.

14. The method of claim 13, wherein the location of the mobile device and the location of the item(s) are associated with one another and accessible by the mobile device to enable filtered searching of items based on proximity to the mobile device location.

15. The method of claim 12, wherein the location of the item is stored in the cloud.

16. The method of claim 12, wherein the location of the item is stored in a distributed ledger.

17. The method of claim 12, wherein the location of the mobile device is stored on a device on the premises at the location.

18. The method of claim 11, wherein the location of the item is sent to, or stored in, a different digital identity repository as the location of the mobile device, wherein the different digital identity repository is selected from a cloud-based application, a locally hosted repository on the mobile device, and a distributed ledger to enable distributed access to item information.

19. The method of claim 1, further comprising applying one or more filters to limit or reduce the number of items presented to a user, wherein the filters include garment type, brand, color, size, and availability.

20. The method of claim 1, wherein the sensor on the items can provide additional information selected from the group consisting of price, size, availability, coupons or discounts, related or complementary items, and combinations thereof.

\* \* \* \* \*